United States Patent
Lamarque-Forget et al.

(10) Patent No.: US 7,067,180 B2
(45) Date of Patent: Jun. 27, 2006

(54) METHOD OF PRODUCING NEMATIC LIQUID-CRYSTAL DEVICES

(75) Inventors: Sandrine Lamarque-Forget, Magny les Hameaux (FR); Sebastien Jacquier, Arceuil (FR); Ivan Dozov, Gif sur Yvette (FR); Luc Faget, Le Plessis Robinson (FR)

(73) Assignee: Nemoptic, Magny Les (FR)

( * ) Notice: Subject to any disclaimer, the term of this patent is extended or adjusted under 35 U.S.C. 154(b) by 87 days.

(21) Appl. No.: 10/454,653

(22) Filed: Jun. 4, 2003

(65) Prior Publication Data

US 2003/0232154 A1 Dec. 18, 2003

(30) Foreign Application Priority Data

Jun. 6, 2002 (FR) .................................. 02 06957

(51) Int. Cl.
*C09K 19/38* (2006.01)
*C09K 19/02* (2006.01)
*C09K 19/52* (2006.01)

(52) U.S. Cl. .................... 428/1.2; 428/1.1; 252/299.01

(58) Field of Classification Search ................ 428/1.1, 428/1.2, 1.21, 1.23, 1.25, 1.26, 1.3; 252/299.01
See application file for complete search history.

(56) References Cited

U.S. PATENT DOCUMENTS

| 5,648,829 | A | * | 7/1997 | Yano ........................... 349/129 |
| 5,724,113 | A | * | 3/1998 | Bryan-Brown et al. ..... 349/123 |
| 6,084,649 | A | * | 7/2000 | Amano et al. ................ 349/96 |
| 6,307,610 | B1 | * | 10/2001 | Jones ........................... 349/133 |
| 6,310,674 | B1 | * | 10/2001 | Suzuki et al. ................ 349/139 |
| 6,727,968 | B1 | * | 4/2004 | Bryan-Brown et al. ..... 349/123 |
| 2003/0112396 | A1 | * | 6/2003 | Lamarque-Forget et al. .......................... 349/124 |

FOREIGN PATENT DOCUMENTS

GB     2 330 213 A  *  4/1999

* cited by examiner

*Primary Examiner*—Shean C. Wu
(74) *Attorney, Agent, or Firm*—Blakely Sokoloff Taylor & Zafman

(57) ABSTRACT

Method of producing nematic liquid-crystal devices, wherein a low zenithal anchoring energy of the liquid crystal is obtained on at least one of its confinement plates by the steps consisting in:
  depositing, on a substrate, a polymer or a copolymer or a terpolymer chosen from the polymers or copolymers derived from those of the poly(vinyl chloride-co-vinyl alkyl ether) type or from those of the poly(vinyl chloride-co-vinyl aryl ether) type;
  stabilizing this polymer coating; and
  defining an azimuthal orientation of the coating for inducing a controlled azimuthal anchoring of the liquid crystal.

17 Claims, No Drawings

METHOD OF PRODUCING NEMATIC LIQUID-CRYSTAL DEVICES

The present invention relates to the field of liquid-crystal display devices.

More precisely, the principal objective of the present invention is to provide novel means of anchoring the liquid-crystal molecules in display cells.

Liquid-crystal display devices generally comprise two confinement plates or substrates provided with electrodes on their internal surface and a liquid-crystal material placed between the two plates. Moreover, means are provided on the confinement plates to ensure and control the anchoring of the liquid-crystal molecules thereon. This anchoring is very important as it determines the orientation of the molecules in the cell and allows it to operate properly.

A person skilled in the art knows in particular how to orient nematic liquid crystals either so as to be perpendicular to the surface of the substrate (this orientation is called homeotropic) or parallel to the latter (this orientation is called planar), using surface treatments such as deposits of polymer.

More precisely still, "twisted nematic" liquid-crystal displays require strong planar anchoring or rather slightly oblique anchoring. This strong planar anchoring is usually obtained according to the prior art by depositing oriented polymers or by evaporation of $SiO_2$ at a given angle.

Another nematic liquid-crystal display family has recently appeared, the family of nematic displays by surface breaking (for example, application WO 97/17632). They allow bistability, and therefore a display which remains indefinitely without consuming energy; only the switching between the two states requires a supply of energy. Another advantage of bistability is the possibility of high definition, since the number of lines depends only on the ratio of the time when the information needs to be changed to the time to write a line. Line numbers greater than 10 000 may also be achieved. The major difficulty in producing this type of display is due to the need to break the anchoring on the surface: it is necessary to have reproducible low-energy anchorings. The principal use of the present invention is in the production of this type of display.

A typical example of these bistable nematic displays using weak anchorings is produced in the following manner. The liquid crystal is placed between two glass plates coated with a conducting layer of indium tin oxide. One of the electrodes has a coating giving an oblique or strong planar anchoring, the other electrode having a coating giving a planar monostable anchoring of low zenithal and medium or strong azimuthal anchoring energy. Two polarizers are furthermore placed on either side of the cell with a suitable orientation.

The principle of this "bistable" technology resides in the presence of two states that are stable without an electric field being applied—a uniform state and a 180° twisted state. These two states correspond to minimum energy levels. They are in equilibrium using a nematic liquid crystal having a positive dielectric anisotropy, for example pentylcyanobiphenyl (known by the name 5CB) doped with a chiral additive. This type of device is generally called a Binem device.

This display technology uses the possibility of breaking the weak planar anchoring, while the strong planar anchoring remains unchanged, in order to pass from one state to the other by applying an electric field of specific shape and intensity. This field, perpendicular to the cell, induces a homeotropic texture similar to the "black" state of TN technology but in which the molecules, close to the low-anchoring-energy surface, are perpendicular to the latter. This nonequilibrium texture is the transition state allowing switching to one of the two stable states. When the field has been stopped, it will convert to one or the other of the stable states depending on whether the elastic or hydrodynamic coupling effects have been favored.

To facilitate the cell switching between the twisted state and the uniform state, the weak planar anchoring may have a small tilt (<1°). The associated strong anchoring may without distinction be planar or oblique, as indicated by the Applicant's patents FR 95/13201, FR 96/04447 and U.S. Pat. No. 6,327,017. In the cell, if the strong anchoring is tilted in one direction and the weak anchoring is tilted in the same direction, the transient field-induced anchoring breaking, called first-order breaking, allows switching from the twisted state to the uniform state. This switching is much more rapid than in the planar case, when it is obtained by elastic coupling. The switching in the opposite direction is achieved as previously by hydrodynamic coupling, which remains effective and easy to control if the tilt angle is low enough.

Various means have already been proposed for anchoring liquid-crystal materials. These anchoring means are subject to many constraints.

A person skilled in the art knows in particular that the anchoring polymers must:
1) be soluble in a medium in order to be suitably applied to the receiving plate or substrate so as for the latter to be suitably wetted and covered;
2) be capable of making the plate or substrate anisotropic;
3) be soluble in the liquid-crystal material; and
4) be capable of defining an anchoring giving the required orientation and the required energy.

Although at the present time there are means capable of defining satisfactory strong anchorings, there are only very few means capable of ensuring weak anchoring.

Thus, the object of the present invention is to provide novel means capable of defining a uniform anchoring stable over time, having a low energy and with a low pretilt, $0°<\psi<1°$, preferably $0.1°<\psi<0.50°$.

This object is achieved within the context of the present invention by a method for preparing liquid-crystal cells, comprising the steps consisting in:
  depositing, on a substrate, a polymer or a copolymer or a terpolymer chosen from the polymers or copolymers derived from those of the poly(vinyl chloride-co-vinyl alkyl ether) type or from those of the poly(vinyl chloride-co-vinyl aryl ether) type;
  stabilizing the coating deposited; and
  defining an azimuthal orientation of the coating for inducing a controlled azimuthal anchoring of the liquid crystal.

In an advantageous embodiment of the invention, the coating is stabilized thermally and/or by exposure to ultraviolet.

In an advantageous embodiment of the invention, the pretilt of the nematic liquid crystal is small, $0°<\psi<1°$, preferably $0.1°<\psi<0.5°$.

The present invention makes it possible to produce low-energy anchoring (alignment) layers in liquid-crystal display cells, especially bistable nematic liquid-crystal cells.

The present invention also relates to the devices thus obtained.

The concepts of "strong" anchoring and "weak" anchoring will now be explained.

The terms "strong anchoring" and "weak anchoring" may be defined according to the developments below. The source of the molecular anchoring of the liquid crystal is the anisotropy of its interactions with the orientation layer. The molecular anchoring may be characterized by its effectiveness and by the direction imposed on the liquid-crystal molecules in the absence of any other external influence. This direction, called the easy axis, is described by the unit vector $\bar{n}_0$ or by the zenithal angle $\theta_0$ and azimuthal angle $\phi_0$ in the Cartesian coordinate system having the z axis perpendicular to the surface of the substrate.

If the easy axis of the liquid-crystal molecules is perpendicular to the substrate, the alignment is homeotropic. If it is parallel to the substrate, the alignment is planar. Existing between these two cases is the alignment called oblique alignment, described by the zenithal anchoring angle defined with respect to the normal to the surface of the substrate, or by its complement called the pretilt angle.

A surface energy density $\gamma$ is introduced in order to characterize the force of interaction between the liquid crystal and the substrate. It depends on the orientation $\bar{n}_s$ of the liquid-crystal molecules on the surface (this also being described by the zenithal angle $\theta_s$ and the azimuthal angle $\phi_s$):

$$\gamma(\theta_s,\phi_s)=\gamma(\theta_o,\phi_o)+g(\theta_s-\theta_o,\phi_s-\phi_o)$$

where g represents the anchoring energy.

It characterizes the anisotropic part of the interaction and (by convention) becomes zero when the molecular orientation of the liquid crystal coincides with the direction of the easy axis.

In most experiments, the variation in one of the two angles (zenithal or azimuthal) is predominant. This is why the two components of the anchoring energy are often studied separately. The most known form of the anchoring energy is that proposed by Rapini and Papoular (*J. Phys. Coll.* (1969) 30, C-4-54):

$$g(\theta_s, \varphi_s) = \frac{w_z}{2}\sin^2(\theta_s) = \frac{w_a}{2}\sin^2(\varphi_s)$$

or in the general case (H. Dreyfus-Lambez et al., *Mol. Cryst. and Liq. Cryst.* (2000), 352, 19-26):

$$g(\theta_s, \varphi_s) = \frac{w_z}{2}\sin^2(\theta_s - \theta_0) + \frac{w_a}{2}\sin^2(\varphi_s - \varphi_0)$$

The positive coefficients $w_z$ and $w_a$ are usually called the zenithal and azimuthal anchoring energies respectively. They have the dimension of a surface energy density.

The anchoring energy may also be given by the extrapolation length. This is the distance between the surface studied and the position of a virtual surface. By imposing an infinitely strong anchoring (it is impossible to make the molecules located on this virtual surface pivot), this surface induces the actual texture of the liquid crystal. The zenithal extrapolation length $L_z$ is proportional to the inverse of the anchoring energy $w_z$ according to the equation $L_z=k_{11}/w_z$ where $k_{11}$ is the coefficient of splay deformation elasticity of the liquid crystal in question. Likewise, the azimuthal extrapolation length $L_a=k_{22}/w_a$ is defined, $k_{22}$ being the coefficient of torsional deformation elasticity of the liquid crystal in question. Usually, the anchoring is said to be strong when, during operation of the cell, the molecules on the surface remain practically parallel to the easy axis. In contrast, the anchoring is weak if an appreciable deviation appears during operation.

The zenithal anchoring energy may be determined by a simple method described below, namely the measurement of the critical field for breaking the anchoring.

It is known that, in a liquid-crystal cell, a strictly planar ($\psi=0$) anchoring may be "broken" by using an electric field $E>E_c$ normal to the plates, applied to a nematic liquid crystal having a positive dielectric anisotropy $\epsilon_a=\epsilon_{//}-\epsilon_\perp>0$. For increasing E and approaching $E_c$, the angle of the surface molecules $\theta_s$ passes rapidly from 90° to 0°; this corresponds to a detectable variation in the birefringence of the cell. Above $E_c$, the angle $\theta_s$ remains zero and the surface is said to be "broken".

The critical field $E_c$ for breaking the zenithal anchoring is defined (I. Dozov et al., *Phys. Rev.* E 58 (1998), 6, 7442–7446) by:

$$E_c = \frac{1}{L_z}\sqrt{\frac{K}{\varepsilon_o\varepsilon_a}}$$

K is the elastic curvature constant (~10 pN) and $L_z$ is the extrapolation length defining the zenithal anchoring energy, which is written as:

$$W_z=(\tfrac{1}{2})(K/L_z)\cos^2\theta_s \text{ ($\theta_s$ is the angle of the surface molecules).}$$

For zenithal anchorings, the anchoring is regarded as strong if $L_z<20$ nm ($E_c>20$ V/μm) and low if $L_z>50$ nm ($E_c<10$ V/μm). The azimuthal anchorings are an order of magnitude smaller. The azimuthal anchoring is considered to be strong if $L_a<100$ nm.

Within the context of the present invention, the low-energy zenithal anchoring is obtained by depositing especially chosen copolymers and terpolymers based on poly (vinyl chloride-co-vinyl alkyl ether) or poly(vinyl chloride-co-vinyl aryl ether) undergoing a series of specific treatments (these copolymers and terpolymers and their specific treatments are specified below).

The anchoring layer based on copolymers and terpolymers based on poly(vinyl chloride-co-vinyl alkyl ether) or poly(vinyl chloride-co-vinyl aryl ether) is deposited from a polymer solution by spin-coating or by other methods, such as flex printing. After the solvent has been evaporated, a polymer layer having a thickness typically (but not limitingly) of between one nanometer and 100 nm is obtained.

Next, a rubbing operation is preferably applied by a textile roller of the known art to the polymer layer in order to impose on it an azimuthal orientation that will induce the azimuthal anchoring of the liquid crystal; in addition, a small pretilt is induced by brushing.

To produce an anchoring-breaking bistable cell, the (so-called weak) anchoring surface must have a planar anchoring or an oblique anchoring with a small pretilt having a relatively low zenithal anchoring energy (for example $L_z \geq 40$ nm) and a relatively strong azimuthal anchoring ($L_a<<d$, the thickness of the cell). The pretilt of the alignment of the nematic must be between 0° and 1°, the optimum values being between 0.1° and 0.50°.

The polymers and copolymers forming the subject of the invention are copolymers or terpolymers derived from vinyl chloride and vinyl ethers of formula I:

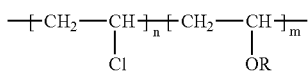

in which R represents a substituted or unsubstituted alkyl or aryl radical; n and m may vary from 0 to 1, preferably with values of n such that 0.5<n<0.8 and of m such that 0.2<m<0.5.

According to one application of the invention, the copolymers consist of vinyl chloride and vinyl isobutyl ether of formula II:

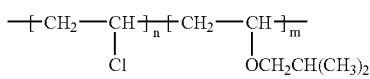

Terpolymers derived from PVC and from two other comonomers are also used to obtain low-energy anchoring layers and constitute another variant of the invention. As examples, the comonomers may be other ether or ester derivatives of vinyl alcohol.

In a variant of the invention, the polymer is a terpolymer based on poly(vinyl chloride)/poly(vinyl isobutyl ether) and another comonomer derived from vinyl alcohol.

The polymers and copolymers are deposited on the substrate by spin-coating a solution. Other means of deposition, such as flex printing, may also be used. The suitable solvents are, for example, ketones, such as methyl ethyl ketone, or other solvents such as dimethylformamide, N-methylpyrrolidone or butoxyethanol or mixtures of these solvents.

After annealing at a temperature below the melting point $T_m$, preferably between 130° C. and 180° C., for a time of between a few minutes and a few hours, the polymer layer is exposed to UV radiation having a wavelength of between 180 and 380 nm, and optionally annealed at a temperature of 130° C. to 180° C. The polymer layer is then rubbed with a roller in order to induce the azimuthal orientation.

The layers are generally produced on a conventional ITO (mixed indium tin oxide) substrate, but other electrodes may be envisioned.

In a variant of the invention, the azimuthal orientation of the anchoring layer may be obtained by methods other than rubbing with a roller, for example using a substrate pre-treated:
  by oblique evaporation of $SiO_2$;
  by a polymer brushed by a roller or stretched; and
  a by a printed or photoinduced etched grating in the substrate.

The method according to the present invention makes it possible to obtain an alignment layer of weak zenithal anchoring, strong azimuthal anchoring and a controlled pretilt between 0° and 1°. The zenithal and azimuthal anchoring energies and the pretilt may be modified in a controlled manner by the thermal, UV or brushing treatments described above.

Two illustrative examples according to the invention are described below.

A first example allows a liquid-crystal cell of 1.5 micron thickness to be mounted between two ITO-covered glass plates. One of the plates has received an evaporation of $SiO_2$ (thickness: 107 nm) in order to give a tilted strong anchoring. The other electrode has been covered with copolymer according to the invention with a thickness of less than 20 nm and treated according to the method of the invention:

Step 1: deposition of the polymer by spin-coating from a 0.75 wt % solution in a 50/50 N-methyl-pyrrolidone/butoxyethanol mixture;

Step 2: annealing at 150° C. for 1 h 30 min;

Step 3: exposure ($\lambda$=254 nm) for 2 hours with a 100-watt mercury vapor lamp;

Step 4: annealing at 150° C. for 30 minutes; and

Step 5: brushing, in order to induce the azimuthal anchoring, with a roller covered with textile velvet.

The two plates described are assembled in order to produce a cell of the Binem type. The cell is filled with doped liquid crystal, a mixture adapted to the Binem-type technology (chiral pitch: 5.6 microns). The cell operates with 10-volt pulses at room temperature and has a contrast of 50.

In a second example, the liquid crystal used is another mixture adapted to the Binem-type technology with an operating range from 0° C. to more than 50° C. for drive pulses varying from 35 to 2 volts, respectively.

The weak planar anchorings prepared according to the invention have the following characteristics:
  the alignment layers are chemically and mechanically stable over time, in contact with the liquid crystal mixtures used;
  the anchoring has a small pretilt, typically around 0.3°; and
  the extrapolation length of the zenithal anchoring, measured by a high-field technique, for 5CB at a temperature of 22° C. is close to $L_z$=80 nm.

Several commercial nematic mixtures were tested and the extrapolation length varies at room temperature from 40 to 80 nm depending on the nematic. These values correspond to zenithal anchoring energies much lower than those obtained with the conventional polymers used in twisted nematic displays.

The strength of the azimuthal anchoring obtained depends on the treatment carried out on the layers. For example, azimuthal extrapolation lengths that may vary between 50 and 200 nm are obtained by brushing. These values are compatible with the operation of Binem-type cells.

The method according to the present invention has in particular the following advantages:
  it avoids the production of low-energy anchoring under vacuum with a silicon oxide layer $SiO_2$. The vacuum deposition process is lengthy and expensive, and it is also difficult to control;
  the use of a polymer layer according to the present invention offers the appreciable advantages of simplicity and of lower manufacturing cost; and
  the small pretilt, stable temperature-wise and time-wise, optimizes the switching and allows Binem-type operation with shorter drive pulses.

Of course, the present invention is not limited to the particular embodiments that have just been described, but extends to all variants falling within its scope.

The claim have been amended as follows:

1. A method of making a liquid crystal alignment layer for bistable nematic liquid-crystal devices, comprising:
  placing two confinement plates respectively on both sides of a nematic liquid crystal layer, said liquid crystal alignment layer having a strong azimuthal anchoring energy for the liquid crystal layer over at least one of its confinement plates, and having on the same confinement plate a low zenithal anchoring energy so as to allow switching between two states corresponding to bistability;

depositing, on a substrate completely free of any previously deposited alignment layer, a polymer or a copolymer or a terpolymer chosen from the polymers or copolymers derived from poly(vinyl chloride-co-vinyl alkyl ether) or from poly(vinyl chloride-co-vinyl aryl ether);

stabilizing this polymer coating, the stabilization comprising at least one thermal annealing step making the polymer deposit non soluble in the liquid crystal material and to preserve the anchoring properties of the polymer deposit; and defining an azimuthal orientation of the coating for inducing a strong and controlled azimuthal anchoring of the liquid crystal, the zenithal anchoring having a critical electric field of breaking the anchoring below 10 v/µm, the azimuthal anchoring having an extrapolation length lying in the range of 50 nm to 200 nm, the liquid crystal containing no additive operating on the anchoring properties, wherein all the treatment steps are chosen in order to define a controlled and stable pretilt of the orientation of the nematic liquid crystal lying in the range between 0° and 1°.

2. The method as claimed in claim 1, wherein the polymers or copolymers are derivatives of vinyl chloride and vinyl ether of formula I:

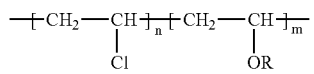

I in which R represents a substituted or unsubstituted alkyl or aryl radical; n and m may vary from greater than 0 to 1.

3. The method as claimed in claim 1 or 2, wherein the copolymers consist of vinyl chloride and vinyl isobutyl ether of formula II:

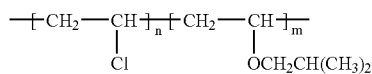

II

4. The method as claimed in claim 1, wherein the polymer is a poly(vinyl chloride-co-vinyl isobutyl ether) copolymer.

5. The method as claimed in claim 1, wherein the polymer is a terpolymer based on poly(vinyl chloride)/poly(vinyl isobutyl ether) and on another comonomer derived from vinyl alcohol.

6. The method as claimed in claim 1, wherein the stabilization involves exposure to ultraviolet light.

7. The method as claimed in claim 1, wherein the stabilization uses one or more annealing operations carried out before and/or after an exposure to ultraviolet light.

8. The method as claimed in claim 7, wherein the one or more annealing operations are carried out at temperatures below the melting point ($T_m$) of the polymer.

9. The method as claimed in claim 6, wherein the exposure step is carried out using ultraviolet light having a wavelength of between 180 and 380 nm.

10. The method as claimed in claim 1, wherein the step defining a controlled azimuthal anchoring of the liquid crystal is ensured by the fact that said polymer is rubbed with a textile-covered roller.

11. The method as claimed in claim 1, wherein all the treatment steps are chosen in order to define a controlled and stable pretilt of the orientation of the nematic, with values between 0.1° and 0.5°.

12. The method as claimed in claim 1, wherein the polymer is deposited on the substrate by spin coating.

13. The method as claimed in claim 1, wherein the polymer is deposited on the substrate by flex printing.

14. The method as claimed in claim 1, wherein the polymer is deposited in solution in a solvent based on a ketone.

15. A bistable nematic liquid-crystal device using at least one liquid crystal alignment layer produced by a method as claimed in claim 1.

16. The device as claimed in claim 15, further comprising an electrode on which is deposited the liquid crystal alignment layer.

17. The method as claimed in claim 2, wherein n and m values are such that 0.5<n<0.8 and 0.2<m<0.5.

* * * * *

UNITED STATES PATENT AND TRADEMARK OFFICE
CERTIFICATE OF CORRECTION

| | |
|---|---|
| PATENT NO. | : 7,067,180 B2 |
| APPLICATION NO. | : 10/454653 |
| DATED | : June 27, 2006 |
| INVENTOR(S) | : Lamarque-Forget et al. |

Page 1 of 1

It is certified that error appears in the above-identified patent and that said Letters Patent is hereby corrected as shown below:

Title Page, Item [75], Inventors, after "Sebastien Jacquier", please delete "Arceuil", and insert -- Arcueil --

Signed and Sealed this

Fifth Day of June, 2007

JON W. DUDAS
*Director of the United States Patent and Trademark Office*